United States Patent [19]
Lee et al.

[11] Patent Number: 5,936,025
[45] Date of Patent: Aug. 10, 1999

[54] CERAMIC POLYMER COMPOSITE DIELECTRIC MATERIAL

[75] Inventors: John D. Lee, Potomac; Gilbert F. Lee, Greenbelt; Bruce T. Hartmann, Silver Spring, all of Md.; Harold C. Wendt, Fredericksburg, Va.; John J. Richardson, Jr., Annapolis, Md.

[73] Assignee: The United States of America as represented by the Secretary of the Navy, Washington, D.C.

[21] Appl. No.: 08/812,153

[22] Filed: Mar. 6, 1997

[51] Int. Cl.⁶ .................. C08J 3/00; C08K 3/20; C08K 3/22; C08L 75/00
[52] U.S. Cl. .................. 524/497; 524/492; 524/493; 524/494; 524/589; 524/590; 528/44; 528/68
[58] Field of Search .................. 524/589, 590, 524/497, 493, 492, 494; 528/44, 68

[56] References Cited

U.S. PATENT DOCUMENTS 5,378,733  1/1995  Bates et al. .................. 521/54
5,484,870  1/1996  Wu .................. 528/28

*Primary Examiner*—Patrick D. Niland
*Attorney, Agent, or Firm*—John Forrest; Roger D. Johnson

[57] ABSTRACT

A shock resistant dielectric material comprising $TiO_2$ particles dispersed in a matrix material which is (1) the polyurea reaction product of a poly(tetramethylene ether)glycol-di-p-aminobenzoate prepolymer and an aromatic diisocyanate or (2) a blend of the polyurea reaction product and a cyanate ester homopolymer of bis(4-cyanatophenyl)-1,1-ethane.

29 Claims, No Drawings

CERAMIC POLYMER COMPOSITE DIELECTRIC MATERIAL

BACKGROUND

This invention relates to dielectric materials and more particularly to dielectric materials for use in electromagnetic windows.

There is a need for a missile radome material that has a high dielectric constant (about 10) and a low dielectric loss factor (about 0.03 to 0.1). The missile radome material must be tough and shock resistant enough to survive the high g forces which occur when the missile is launched. Conventional materials which have the required dielectric properties are too brittle and fail to meet the shock requirements.

Therefore it would be desirable to provide a material suitable for missile radomes which has a high dielectric constant, low dielectric loss, and which is tough enough to survive missile launch without damage.

SUMMARY

According, an object of this invention is to provide a new dielectric material.

Another object of this invention is to provide a tough dielectric material capable of surviving missile launch without damage.

A further object of this invention is to provide a tough, new dielectric material which has a high dielectric constant and a low dielectric loss.

These and other objects of this invention are accomplished by providing a dielectric composite material comprising $TiO_2$ particles uniformly distributed through a matrix of a polyurea which is formed by reacting a poly(tetramethylene ether)glycol-di-p-aminobenzoate prepolymer with 4,4'-diphenylmethane diisocyanate.

Another embodiment of the invention comprises $TiO_2$ particles uniformly distributed through a matrix which is a blend of the above polyurea and a polycyanurate homopolymer formed by polymerizing bis(4-cyanatophenyl)-1,1-ethane.

Other embodiments of the invention are formed by adding microglass fibers to the $TiO_2$/polymer composites or to the $TiO_2$/polymer-polycyanurate composites

DETAILED DESCRIPTION

An embodiment of this invention is a composite material comprising titanium dioxide ($TiO_2$) particles uniformly distributed in a matrix of a polyurea formed by the reaction of a poly(tetramethylene ether)glycol-di-p-aminobenzoate prepolymer,

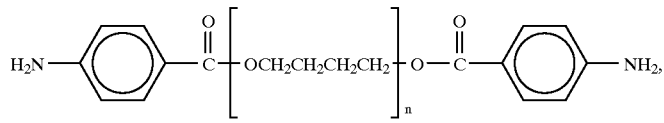

with 4,4'-diphenylmethane diisocyanate (MDI),

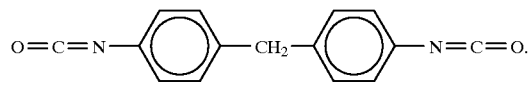

The poly(tetramethylene ether) glycol-di-p-aminobenzoate prepolymer preferably has an average molecular weight of from about 650 to about 3000, more preferably from 900 to 1500, and still more preferably from 1150 to 1350. The proportion of prepolymer to MDI is selected to provide a slight excess of isocyanate groups to amine groups which produces a lightly cross linked polyurea matrix. The ratio of isocyanate functional groups to amine functional groups is preferably from more than 1.0:1 to about 1.2:1, more preferably from 1.01:1 to 1.10:1, still more preferably from 1.03:1 to 1.07:1 and most preferably about 1.05:1.

The dielectric constant of the $TiO_2$/polyurea composite is controlled by controlling the weight percent of $TiO_2$ in the composite. At zero weight percent $TiO_2$, the composition has a dielectric constant of about 3; at 30 weight percent $TiO_2$, the $TiO_2$/polyurea composite has a dielectric constant of about 10; and at maximum solid loading of about 80 weight percent $TiO_2$, the $TiO_2$/polyurea composite will have a dielectric constant of about 20. The $TiO_2$/polyurea composite comprises preferably from more than zero to about 80, more preferably from 5 to 60, still more preferably 20 to 40, and most preferably about 30 weight percent of $TiO_2$/particles with the remainder of the $TiO_2$/polyurea composite being the polyurea matrix material. Thus the polyurea will comprise from about 20 to less than 100, more preferably from 40 to 95, still more preferably from 60 to 80, and most preferably about 70 weight percent of the $TiO_2$/polyurea composite material. The resulting $TiO_2$/polyurea composites are tough and shock resistant, surviving shock test loadings of greater than 20,000 g's. A dielectric loss factor as low as 0.1 has been achieve with the $TiO_2$/polyurea composites.

A second embodiment of this invention is a composite material comprising $TiO_2$ particles uniformly distributed in a polymer matrix which is a blend of the above polyurea and a cyanate ester homopolymer (or polycyanurate). As described above, the polyurea is the reaction product of a poly(tetramethylene ether) glycol-di-p-aminobenzoate prepolymer with a slight excess of 4 4,4'-diphenylmethane diisocyanate. The cyanate ester homopolymer (or polycyanurate) is formed by heating bis (4-cyanatophenyl)-1,1-ethane (CAS 47073-92-7) in the presence of a metal catalyst. Examples of suitable metal catalysts and their use are disclosed by Richard W. Oehmke in U.S. Pat. No. 3,694,410, herein incorporated by reference in its entirety. Copper acetylacetone chelate catalyst [$Cu(AcAc)_2$] was used in the present examples. The reaction can be represented as follows:

$$N\equiv C-O-R-O-C\equiv N$$

↓ heat, catalyst

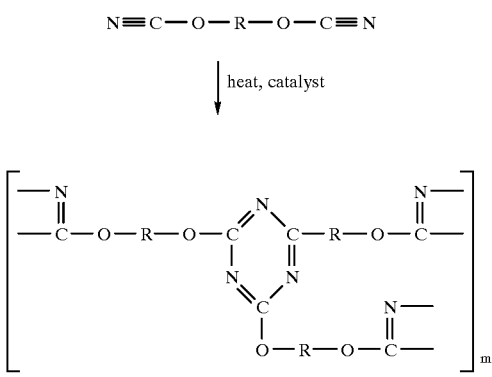

wherein R is

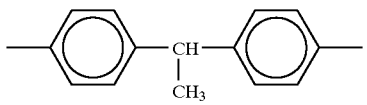

As was the case for the TiO$_2$/polyurea composite, the dielectric constant of the TiO$_2$/polyurea-polycyanurate composite is controlled by controlling the weight percent of TiO$_2$ in the composite. At zero weight percent TiO$_2$, the composite has a dielectric constant of about 3; at 30 weight percent TiO$_2$, the TiO$_2$/polyurea-polycyanurate composite has a dielectric constant of about 10; and at a maximum solid loading of about 70 weight percent TiO$_2$, the TiO$_2$/polyurea-polycyanurate composite will have a dielectric constant of about 20. The TiO$_2$/polyurea-polycyanurate composite comprises preferably from more than zero to about 80, more preferably from 5 to 60, still more preferably from 20 to 40, and most preferably about 30 weight percent TiO$_2$, with the remainder of the TiO$_2$/polyurea-polycyanurate composite being the polyurea-polycyanurate matrix which is a blend of the polyurea and the polycyanurate. Thus, the polyurea-polycyanurate matrix material will comprise from about 20 to less than 100, more preferably from 40 to 95, still more preferably from 60 to 80, and most preferably about 70 weight percent of the TiO$_2$/polyurea-polycyanurate composite material. The polyurea-polycyanurate matrix material preferably comprises from more than zero to about 80, more preferably from 50 to 75, and still more preferably from 55 to 70 weight percent of the homopolymer of bis(4-cyanatophenyl)-1,1-ethane with the remainder of the polymer matrix being the polyurea reaction product of the poly(tetramethylene ether) glycol-di-p-aminobenzoate prepolymer and 4,4'-diphenylmethane diisocyanate. By substituting the homopolymer of bis(4-cyanatophenyl)-1,1-ethane for some of the polyurea, the dielectric loss factor of the composite can be lowered to about 0.03. The homopolymer of bis(4-cyanatophenyl)-1,1-ethane is also a very tough material that can withstand nearly as much shock as the polyurea. As a result, the TiO$_2$/polyurea-polycyanurate composite survives the shock test with 20,000 g's loading.

The type of TiO$_2$ particles used is not critical but rather is based on practical considerations. For instance, the uniform distribution of smaller TiO$_2$ particles will produce a more uniform dielectric material. Moreover, easier processing and greater solid loading can be achieved by using a mixture of particles with different diameters. In the present examples, a mixture of particles with a rutile crystal structure and a typical mean diameter of 205 nm and particles having an anatase crystal structure and a typical mean diameter of 243 nm was used. This also shows that the crystal structure of the TiO$_2$ is not critical to the composites of this invention.

In yet other embodiments, the TiO$_2$/polyurea composite material and the TiO$_2$/polyurea-polycyanurate composite material are modified by the addition of microglass fibers. The purpose of the microglass fibers is threefold: (1) to increase the viscosity of the mixtures before curing to make processing easier, (2) to increase the impact strength of the composites, and (3) to promote better bonding of the composites to metals. Preferably from more than zero to about 30, more preferably from 5 to 25, and still more preferably from 10 to 20 weight percent of the polyurea or of the polyurea-polycyanurate blend in the matrix is replaced with the microglass fibers.

The TiO$_2$/polyurea-glass composite material comprises preferably from more than zero to about 80, more preferably from 5 to 60, still more preferably from 20 to 40, and most preferably about 30 weight percent of TiO$_2$ particles with the remainder of the TiO$_2$/polyurea-glass composite being the polyurea-glass matrix material. The polyurea-glass matrix material comprises preferably from more than zero to about 30, more preferably from 5 to 25, and still more preferably from 10 to 20 weight percent microglass fibers with the remainder of the polyurea-glass matrix material being the polyurea reaction product of the poly(tetramethylene ether) glycol-di-aminobenzoate prepolymer with 4,4'-diphenylmethane diisocyanate. The TiO$_2$ particles and the microglass fibers are both uniformly distributed throughout the polyurea.

Similarly, the TiO$_2$/polyurea-polycyanurate-glass composite material comprises preferably from more than zero to about 80, more preferably from 5 to 60, still more preferably from 20 to 40, and most preferably about 30 weight percent of TiO$_2$ particles with the remainder of the TiO$_2$/polyurea-polycyanurate-glass composite being the polyurea-polycyanurate-glass matrix material. The polyurea-polycyanurate-glass matrix material comprises preferably from more than zero to about 30, more preferably from 5 to 25, and still more preferably from 10 to 20 weight percent microglass fibers with the remainder of the polyurea-polycyanurate-glass material being a polyurea-polycyanurate blend. The polyurea-polycyanurate blend preferably comprises from more than zero to about 80, more preferably from 50 to 75 and still more preferably from 55 to 70 weight percent of the homopolymer of bis(4-cyanatophenyl)-1,1-ethane, (the polycyanurate) with the remainder of the polyurea-polycyanate blend being the polyurea reaction product of the poly(tetramethylene ether) glycol-di-p-aminobenzoate prepolymer and 4,4'-diphenylmethane diisocyanate. The TiO$_2$ particles and the microglass fibers are both uniformly distributed throughout the polyurea.

TRADEMARKS

"Versalink 1000" is the Air Products & Chemicals, Inc. trademark for a diamine with the chemical designation poly(tetramethylene ether)glycol-di-p-aminobenzoate, CAS registry number 54667-43-5. It has a nominal molecular weight of 1238.

"Isonate 2143L" is the Dow Chemical Co. trademark for a modified 4,4'-diphenylmethane diisocyanate (MDI). It is a mixture of 70 to 80% pure MDI (CAS 026447-40-5) and 20 to 30% cyclic trimer (CAS 039310-05-9).

"Kronos 1000" is the Kronos Inc. trademark for titanium dioxide, TiO$_2$, with anatase crystal structure and size such that 0.04 percent maximum is retained on 325 mesh (CAS 13463-76-7). "Kronos 2073" is the Kronos Inc. trademark for titanium dioxide, TiO$_2$ with rutile crystal structure and size such that 0.01 percent maximum is retained on 325 mesh (CAS 13463-76-7).

"AroCy L-10" is the Ciba-Geigy Corp. trademark for a low viscosity liquid dicyanate monomer, bis(4-cyanatophenyl)-1,1-ethane (CAS 47073-92-7).

"Microglass Milled Fiber 9007D" is the Fibertec Co. trademark for 10 μm diameter E-glass filaments hammer-milled to a density of 0.525 g/cm³ (CAS 65997-17-3).

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

TiO$_2$/Polymer Composite (No Glass)

For each sample, 100 g of poly(tetramethylene ether) glycol-di-p-aminobenzoate ("Versalink 1000", Air Products & Chemicals, Inc.) having a nominal molecular weight of 1238 was degassed at 50° C. for 30 minutes under a nominal vacuum of 29 inches or better. The desired amount of TiO$_2$ powder was added to the "Versalink 1000" at room temperature and the resulting mixture was degassed for 30 minutes at room temperature under a vacuum of 29 inches or better. The TiO$_2$ powder was a mixture of 50 weight percent "Kronos 1000" and 50 weight percent "Kronos 2073". A stoichiometic amount (20.2 g) of 4,4'-diphenylmethane diisocyanate ("Isonate 2143L") "Versalink 1000" and mixed for 2 minutes under vacuum (29 inches or better) using a high speed mixer. the resulting mixture was quickly put into a preheated mold and cured at 70° C. for 2 hours.

Table 1 summarizes the compositions, dielectric constants, and dielectric loss factors, for samples prepared in this example.

| Sample No. | Wt % TiO$_2$ | Wt %[1] polyurea | Dielectric Constant | Dielectric loss factor |
|---|---|---|---|---|
| 1 | 50 | 50 | 5.7 | .08 |
| 2 | 56 | 44 | 7.8 | .08 |
| 3 | 63 | 37 | 10.4 | .06 |
| 4 | 67 | 33 | 12.5 | .04 |
| 5 | 75 | 25 | 17.0 | .03 |
| 6 | 80 | 20 | 20.1 | .02 |

[1]The polyurea is the reaction product of poly(tetramethylene ester)glycol-di-p-aminobenzoate and 4,4'-diphenylmethane diisocyanate.

The dielectric constant and dielectric loss factor were determined using a Hewlett-Packard dielectric probe with a Hewlett-Packard network analyzer. The dielectric probe is an open-ended coaxial line. To make a measurement, the flat face of the probe is simply placed on the sample. An electromagnetic signal is transmitted to the surface of the sample. The reflected signal is related to the dielectric constant and dielectric loss factor. The network analyzer provides the transmitted signal and analyzes the reflected signal.

The shock simulator is the VHG (Very High "G") machine. It is a portable tester capable of producing steel-on-steel impacts in the range of 100,000 g with durations of 40 to 45 microseconds. The 6-foot tall, 1700-pound machine has a payload capacity of 10 pounds and is operated with low pressure (100 psi) air. The tester produces a high g impact by firing a 30-pound steel piston upward in a vertical air gun toward a test carriage resting just above the gun muzzle. At impact, the piston transmits its energy to the test carriage, accelerating upward where it is stopped by hydraulic pistons after 1-foot of travel. VHG tests were performed in two orientations at two respective shock levels. First, each fuze was oriented along its longitudinal axis on the VHG machine. The VHG machine was pressurized to 12 psi, a level corresponding to a 26,000 g peak acceleration. This simulated the setback ("shock start") of the fuze in a 5"/54 gun. Then each fuze was oriented with the axis perpendicular to the loading. The VHG machine was pressurized to 8.5 psi, a level corresponding to a 12,000 g peak acceleration. This simulated balloting (side loads resulting from slapping against the sides of a worn gun barrel) on the fuze in a 5"/54 gun.

EXAMPLE 2

TiO$_2$/Polyurea-Polycyanate Composite (No Glass)

For each sample, 100 g of bis(4-cyanatophenyl)-1,1-ethane ("AroCy L-10") was degassed for about one half hour at room temperature using a nominal vacuum of 29 inches or better. Next, 125 grams of "Kronos 1000" TiO$_2$ and then 125 grams of "Kronos 2073" TiO$_2$ were added to the bis(4-cyanatophenyl)-1,1-ethane with mixing at room temperature. The mixture was then degassed for about an hour at room temperature under a nominal vacuum of 29 inches or better. Next, 40 grams of poly(tetramethylene ether)glycol-di-p-aminobenzoate having a nominal molecular weight of 1238 ("Versalink 1000") was added and the mixture was degassed for about 15 minutes at room temperature under a nominal vacuum of 29 inches. About 8.5 grams of 4,4'-diphenylmethane diisocyanate ("Isonate 2143L") and copper acetylacetonate chelate catalyst [Cu(AcAc)$_2$] was added with mixing for 2 minutes using a high speed mechanical mixer. The mixture was then syringed into a mold preheated to 100° C. and then cured for 16 hours at 100° C. The resulting composite was composed of about 63 weight percent of TiO$_2$ powder and about 37 weight percent of polymer matrix material. The polymer matrix material was composed of about 67 weight percent of the polycyanate and about 33 weight percent of the polyurea.

The dielectric constant and dielectric loss factor of the composite were measured by the method using in example 1. The dielectric constant was 8.9 and the dielectric loss factor was less than 0.01.

The composite material passed the shock test without damage.

A comparison of the test results for this composite material with the composite materials of example 1 shows that the substitution of the polycyanate for some of the polyurea reduces the dielectric loss factor. The shock test results show that the use of the polycyanate does not significantly affect the strength of the composite materials. The TiO$_2$/polyurea-polycyanate composite is suitable for use in fuses. Finally, the dielectric constant is not changed by the use of polycyanate because it depends only on the weight percent of TiO$_2$ in the composite.

EXAMPLE 3

TiO$_2$/Polyurea-Polycyanate-Glass Fiber Composite

This composite was prepared in the same way as the composite of example 2 except 80 grams of "Microglass Milled Fiber 9007D" glass fibers was added after the TiO$_2$ had all been added.

The dielectric constant and dielectric loss factor of the composite were measured by the method used in example 1.

The dielectric constant was 8.6 and the dielectric loss factor was less than 0.01.

The composite material passed the shock test without damage.

The dielectric and strength properties of this $TiO_2$/polyurea-polycyanate-glass composite (example 3) are comparable to the same properties for the $TiO_2$/polyurea-polycyanate composite (example 2). However, the addition of glass fibers increases the viscosity of the liquid composite precursor mixture, thus making processing easier.

We claim:

1. A composite material comprising:
   A. from more than zero to about 80 weight percent of $TiO_2$ particles; and
   B. from about 20 to less than 100 weight percent of a matrix material that comprises a polymer blend of
      (1) from more than zero to about 80 weight percent of a cyanate ester homopolymer of bis(4-cyanatophenyl)-1,1-ethane; and
      (2) from about 20 to less than 100 weight percent of a polyurea which is the reaction product of
         (a) a poly(tetramethylene ether)glycol-di-p-aminobenzoate prepolymer having an average molecular weight of from about 650 to about 3000, and
         (b) 4,4'-diphenylmethane diisocyanate,
   wherein the ratio of isocyanate functional groups to amine functional groups is from more than 1.0:1 to about 1.2:1.

2. The composite of claim 1 wherein the $TiO_2$ particles are uniformly distributed throughout the matrix material.

3. The composite of claim 1 wherein the $TiO_2$ particles comprise from 5 to 60 weight percent of the composite.

4. The composite of claim 3 wherein the $TiO_2$ particles comprise from 20 to 40 weight percent of the composite.

5. The composite of claim 1 wherein the $TiO_2$ particles have a mean diameter of less than 1 micron.

6. The composite of claim 1 wherein the matrix material comprises a polymer blend of from 50 to 75 weight percent of the cyanate ester homopolymer of bis(4-cyanatophenyl-1,1-ethane with the remain of the polymer blend being the polyurea reaction product of the poly(tetramethylene ether) glycol-di-p-aminobenzoate prepolymer and 4,4'-diphenylmethane diisocyanate.

7. The composite of claim 6 wherein the matrix material comprises a polymer blend of from 55 to 70 weight percent of the cyanate ester homopolymer of bis(4-cyanatophenyl-1,1-ethane with the remain of the polymer blend being the polyurea reaction product of the poly(tetramethylene ether) glycol-di-p-aminobenzoate prepolymer and 4,4'-diphenylmethane diisocyanate.

8. The composite of claim 1 wherein the polyurea reaction product is formed from a poly(tetramethylene ether)glycol-di-p-aminobenzoate prepolymer having an average molecular weight of from 900 to 1500.

9. The composite of claim 8 wherein the polyurea reaction product is formed from a poly(tetramethylene ether)glycol-di-p-aminobenzoate prepolymer having an average molecular weight of from 1150 to 1350.

10. A composite material comprising:
    A. from more than zero to about 80 weight percent of $TiO_2$ particles, and
    B. from about 20 to less than 100 weight percent of a polyurea-glass matrix material comprising
       (1) from more than zero to about 30 weight percent of microglass fibers, and
       (2) from about 70 to less than 100 weight percent of a polyurea reaction product of
          (a) a poly(tetramethylene ether)glycol-di-p-aminobenzoate prepolymer having an average molecular weight of from about 650 to about 3000, and
          (b) 4,4'-diphenylmethane diisocyanate,
    wherein the ratio of isocyanate functional group to amine functional groups is from more than 1.0:1 to about 1.2:1.

11. The composite material of claim 10 wherein the $TiO_2$ particles are uniformly distributed throughout the polyurea-glass matrix material.

12. The composite of claim 10 wherein the $TiO_2$ particles comprise from 5 to 60 weight percent of the composite.

13. The composite of claim 12 wherein the $TiO_2$ particles comprise from 20 to 40 weight percent of the composite.

14. The composite of claim 10 wherein the $TiO_2$ particles have a mean diameter of less than 1 micron.

15. The composite of claim 10 wherein the microglass fibers comprise from 5 to 25 weight percent of the polyurea-glass matrix material.

16. The composite of claim 15 wherein the microglass fibers comprise from 10 to 20 weight percent of the polyurea-glass matrix material.

17. The composite of claim 10 wherein the polyurea reaction product is formed from a poly(tetramethylene ether) glycol-di-p-aminobenzoate prepolymer having an average molecular weight of from 900 to 1500.

18. The composite of claim 17 wherein the polyurea reaction product is formed from a poly(tetramethylene ether) glycol-di-p-aminobenzoate prepolymer having an average molecular weight of from 1150 to 1350.

19. A composite material comprising:
    A. from more than zero to about 80 weight percent of $TiO_2$ particles; and
    B. from about 20 to less than 100 weight percent of a polyurea-polycyanurate-glass matrix material comprising,
       (1) from more than zero to about 30 weight percent of microglass fibers, and
       (2) from about 70 to less than 100 weight percent of a polyurea-polycyanurate blend comprising
          (a) from more than zero to about 80 weight percent of a cyanate ester homopolymer of bis(4-cyanatophenyl)-1,1-ethane, and
          (b) from about 20 to less than 100 weight percent of a polyurea which is the reaction product of
             (i) a poly(tetramethylene ether)glycol-di-p-aminobenzoate prepolymer having an average molecular weight of from about 650 to about 3000, and
             (ii) 4,4'-diphenylmethane diisocyanate,
    wherein the ratio of isocyanate functional groups to amine functional groups is from more than 1.0:1 to about 1.2:1.

20. The composite material of claim 19 wherein the $TiO_2$ particles are uniformly distributed throughout the polyurea-polycyanurate-glass matrix material.

21. The composite of claim 19 wherein the $TiO_2$ particles comprise from 5 to 60 weight percent of the composite.

22. The composite of claim 21 wherein the $TiO_2$ particles comprise from 20 to 40 weight percent of the composite.

23. The composite of claim 19 wherein the $TiO_2$ particles have a mean diameter of less than 1 micron.

24. The composite of claim 19 wherein the microglass fibers comprise from 5 to 25 weight percent of the polyurea-polycyanurate-glass matrix material.

25. The composite of claim 24 wherein the microglass fibers comprise from 10 to 20 weight percent of the polyurea-polycyanurate-glass matrix material.

26. The composite of claim 19 wherein the polyurea-polycyanurate blend comprises from 50 to 75 weight percent of the cyanate ester homopolymer of bis(4-cyanatophenyl-1,1-ethane with the remainder of the blend being the polyurea reaction product of the poly(tetramethylene ether) glycol-di-p-aminobenzoate prepolymer and 4,4'-diphenylmethane diisocyanate.

27. The composite of claim 26 wherein the polyurea-polycyanurate blend comprises from 50 to 75 weight percent of the cyanate ester homopolymer of bis(4-cyanatophenyl-1,1-ethane with the remainder of the blend being the polyurea reaction product of the poly(tetramethylene ether) glycol-di-p-aminobenzoate prepolymer and 4,4'-diphenylmethane diisocyanate.

28. The composite of claim 19 wherein the polyurea reaction product is formed from a poly(tetramethylene ether) glycol-di-p-aminobenzoate prepolymer having an average molecular weight of from 900 to 1500.

29. The composite of claim 28 wherein the polyurea reaction product is formed from a poly(tetramethylene ether) glycol-di-p-aminobenzoate prepolymer having an average molecular weight of from 1150 to 1350.

* * * * *